US011372317B2

(12) United States Patent
Hsu et al.

(10) Patent No.: US 11,372,317 B2
(45) Date of Patent: Jun. 28, 2022

(54) CAMERA SUPPORTING DEVICE AND CAMERA THEREWITH

(71) Applicant: VIVOTEK INC., New Taipei (TW)

(72) Inventors: Shao-Tzu Hsu, New Taipei (TW); Ming-Wei Wang, New Taipei (TW); Chang-Ping Hu, New Taipei (TW); Hsiao-Lung Liang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 59 days.

(21) Appl. No.: 17/019,337

(22) Filed: Sep. 13, 2020

(65) Prior Publication Data

US 2021/0132476 A1 May 6, 2021

(30) Foreign Application Priority Data

Oct. 31, 2019 (TW) .................................. 108139404

(51) Int. Cl.
  *G03B 17/56* (2021.01)
  *F16M 11/18* (2006.01)
  *F16M 11/12* (2006.01)
  *G08B 13/196* (2006.01)

(52) U.S. Cl.
  CPC ......... *G03B 17/561* (2013.01); *F16M 11/126* (2013.01); *F16M 11/18* (2013.01); *G08B 13/1963* (2013.01); *G08B 13/19619* (2013.01)

(58) Field of Classification Search
  CPC .............................................. G08B 13/1963
  See application file for complete search history.

(56) References Cited

U.S. PATENT DOCUMENTS

| 7,446,813 | B2 * | 11/2008 | Nakamoto | H04N 5/2259 |
| | | | | 348/151 |
| 9,042,714 | B2 * | 5/2015 | Aiba | F16M 11/10 |
| | | | | 396/20 |
| 9,628,683 | B2 * | 4/2017 | Chu | H04N 7/183 |
| 2004/0223062 | A1 * | 11/2004 | Pettegrew | F16M 11/18 |
| | | | | 348/211.4 |

FOREIGN PATENT DOCUMENTS

| KR | 100847088 B1 * | 7/2008 |
| TW | M246921 | 10/2004 |
| TW | M271324 | 7/2005 |

* cited by examiner

*Primary Examiner* — Leon W Rhodes, Jr.
(74) *Attorney, Agent, or Firm* — Winston Hsu

(57) ABSTRACT

A camera supporting device includes a supporting frame, an outer casing, a camera holding structure, and a linkage mechanism. The outer casing is rotatably connected to the supporting frame. The camera holding structure is rotatably connected to the supporting frame independently of the outer casing. The linkage mechanism incudes a driving part and a driven part kinematically connected to the driving part. The driving part is fixedly connected to the camera holding structure. The driven part is fixedly connected to the outer casing. An image-capturing device can be fixed on the camera holding structure. Through the camera holding structure driving the outer casing through the linkage mechanism, the outer casing can provide a wider angle range available for the image-capturing device to capturing exterior images.

20 Claims, 15 Drawing Sheets

CAMERA SUPPORTING DEVICE AND CAMERA THEREWITH

BACKGROUND OF THE INVENTION

1. Field of the Invention

The present invention relates to a camera, and more particularly to a rotatable camera.

2. Description of the Prior Art

General surveillance cameras are usually disposed by a fixed shooting angle, so that the surveillance range is directly limited by the camera's field of view. For this issue, the lens of some surveillance cameras can be rotated to increase the surveillance range. In general, the surveillance cameras have a fixed base, a rotatable camera lens, and an outer casing. The fixed base is usually fixed onto a wall or ceiling. The camera lens is rotatably disposed on the fixed base. The outer casing is fixed to the fixed base and covers the camera lens. The outer casing usually has a hemispheric transparent portion. The camera lens captures external images through the hemispheric transparent portion, so the effective shooting angle range of the surveillance cameras is limited by the size of the hemispheric transparent portion in principle. Furthermore, the transmission angle range of the hemispheric transparent portion is limited, and further in view of the field of view of the camera lens, the actual available rotation angle range of the camera lens is usually less than 180 degrees. Furthermore, considering that if the semi-circular transparent portion itself is not a complete hemisphere, of which, for example, the curvature of the surrounding portion is different from that of other portions (e.g. the surrounding portion is cylindrical), images which the camera lens captures through the surrounding portion may be substantially distorted, which will further narrow the actual available rotation angle range of the camera lens.

SUMMARY OF THE INVENTION

An objective of the invention is to provide a camera supporting device. A camera holding structure of the camera supporting device can be rotated to move an outer casing of the camera supporting device, thereby increasing the effective shooting angle range.

A camera supporting device according to the invention includes a supporting frame, an outer casing, a camera holding structure, and a linkage mechanism. The outer casing is rotatably connected to the supporting frame. The camera holding structure is independent of the outer casing and rotatably connected to the supporting frame. The linkage mechanism includes a driving part and a driven part kinematically connected to the driving part. The driving part is fixedly connected to the camera holding structure. The driven part is fixedly connected to the outer casing. Therein, the camera holding structure is linked with the outer casing through the linkage mechanism.

Another objective of the invention is to provide a camera, which includes a camera supporting device providing rotation mechanism for an image-capturing device of the camera. A camera holding structure of the camera supporting device can be rotated to move an outer casing of the camera supporting device, thereby increasing the effective shooting angle range.

A camera according to the invention includes an image-capturing device and a camera supporting device. The camera supporting device includes a supporting frame, an outer casing, a camera holding structure, and a linkage mechanism. The outer casing is rotatably connected to the supporting frame and has a light-permeable cover. The camera holding structure is independent of the outer casing and rotatably connected to the supporting frame. The linkage mechanism includes a driving part and a driven part kinematically connected to the driving part. The driving part is fixedly connected to the camera holding structure. The driven part is fixedly connected to the outer casing. The camera holding structure is linked with the outer casing through the linkage mechanism. The image-capturing device is fixedly on the camera holding structure and includes a lens. The lens faces the light-permeable cover so that the image-capturing device captures external images through the light-permeable cover.

Compared with the prior art, in the camera supporting device and the camera according to the invention, through the camera holding structure kinematically driving the outer casing through the linkage mechanism, the outer casing can provide a wider angle range available for the image-capturing device fixed on the camera holding structure to capturing exterior images.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
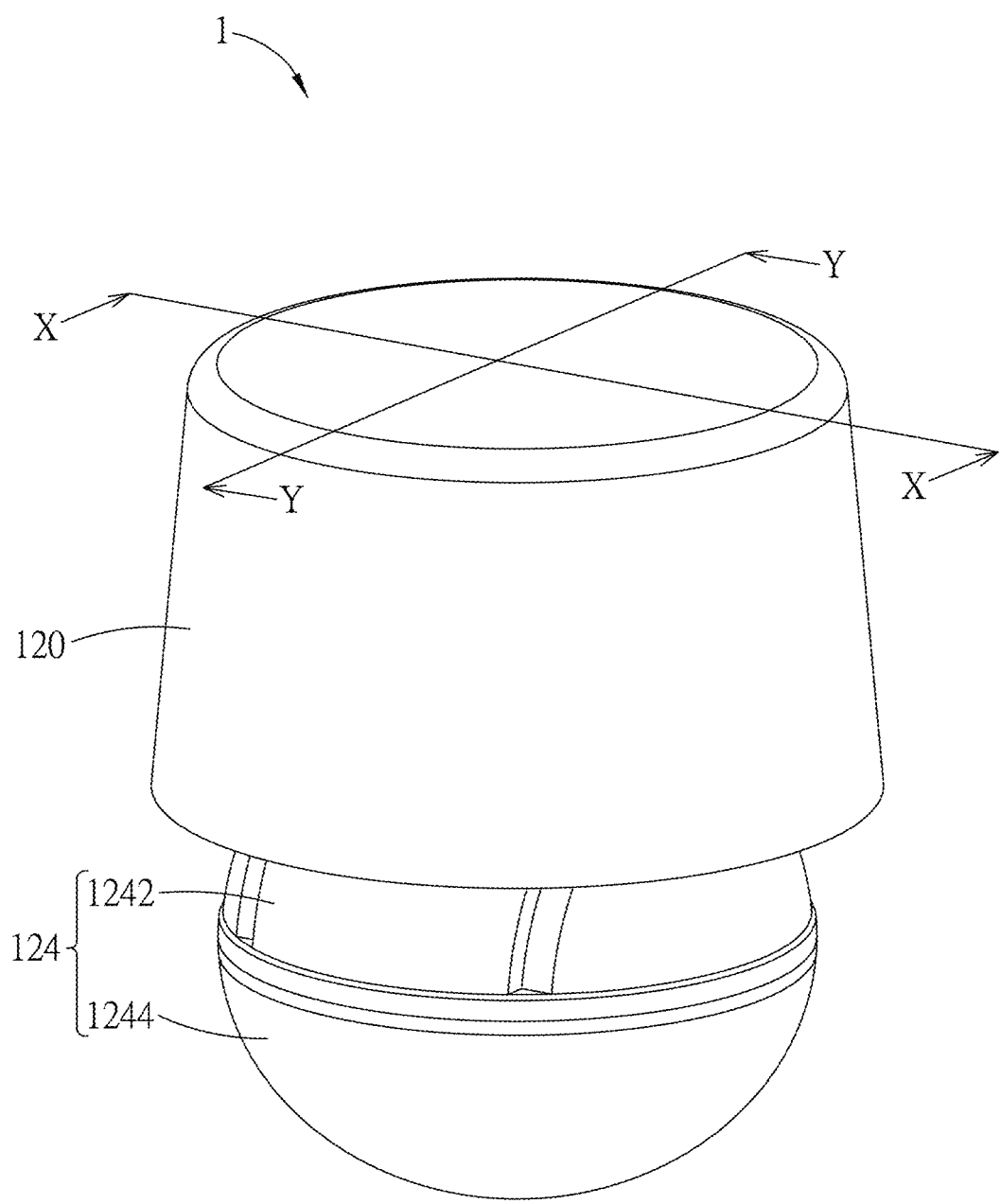
FIG. 1 is a schematic diagram illustrating a camera according to an embodiment.
Figure 2:
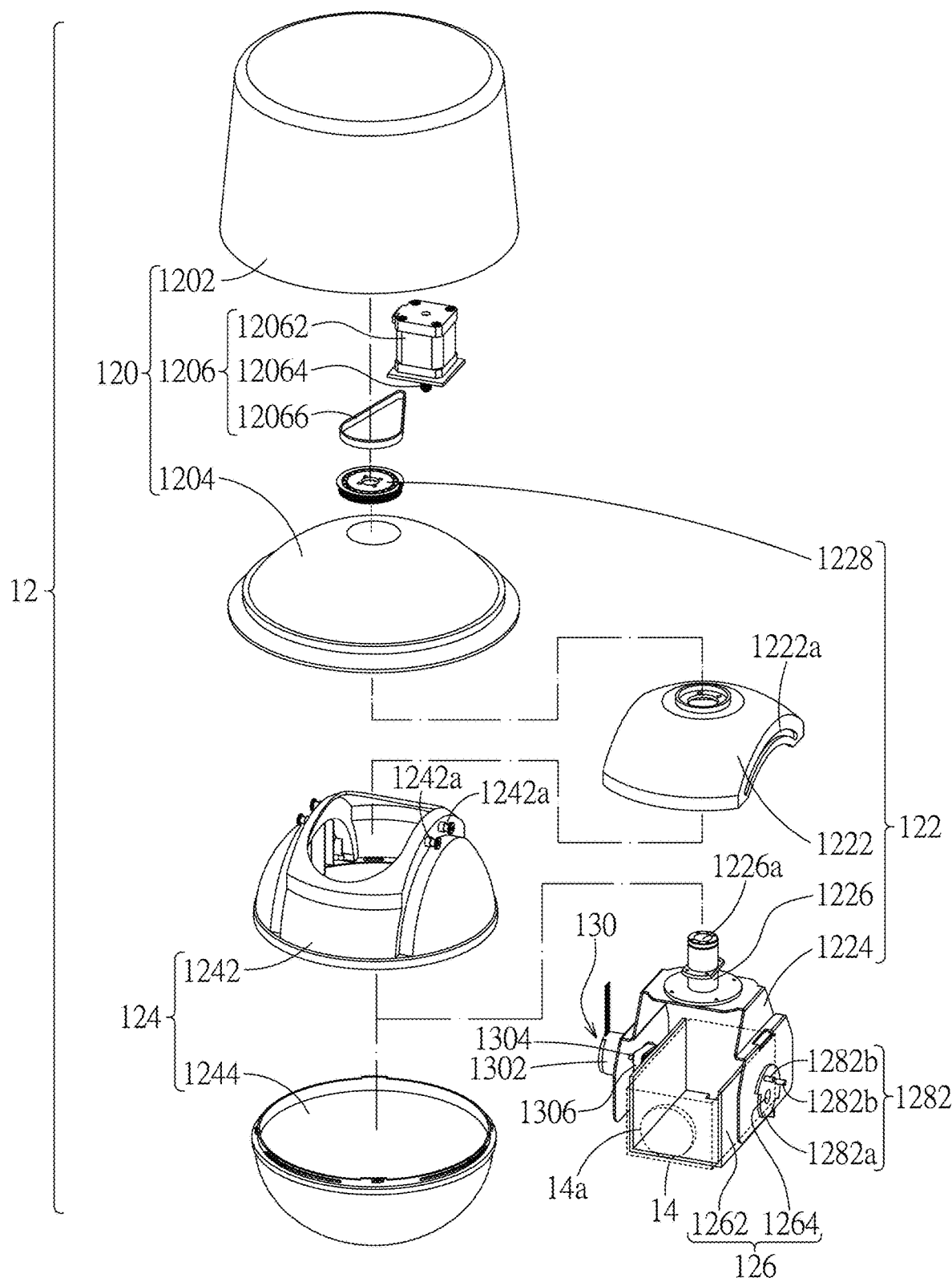
FIG. 2 is a partially exploded view of the camera in FIG. 1.
Figure 3:
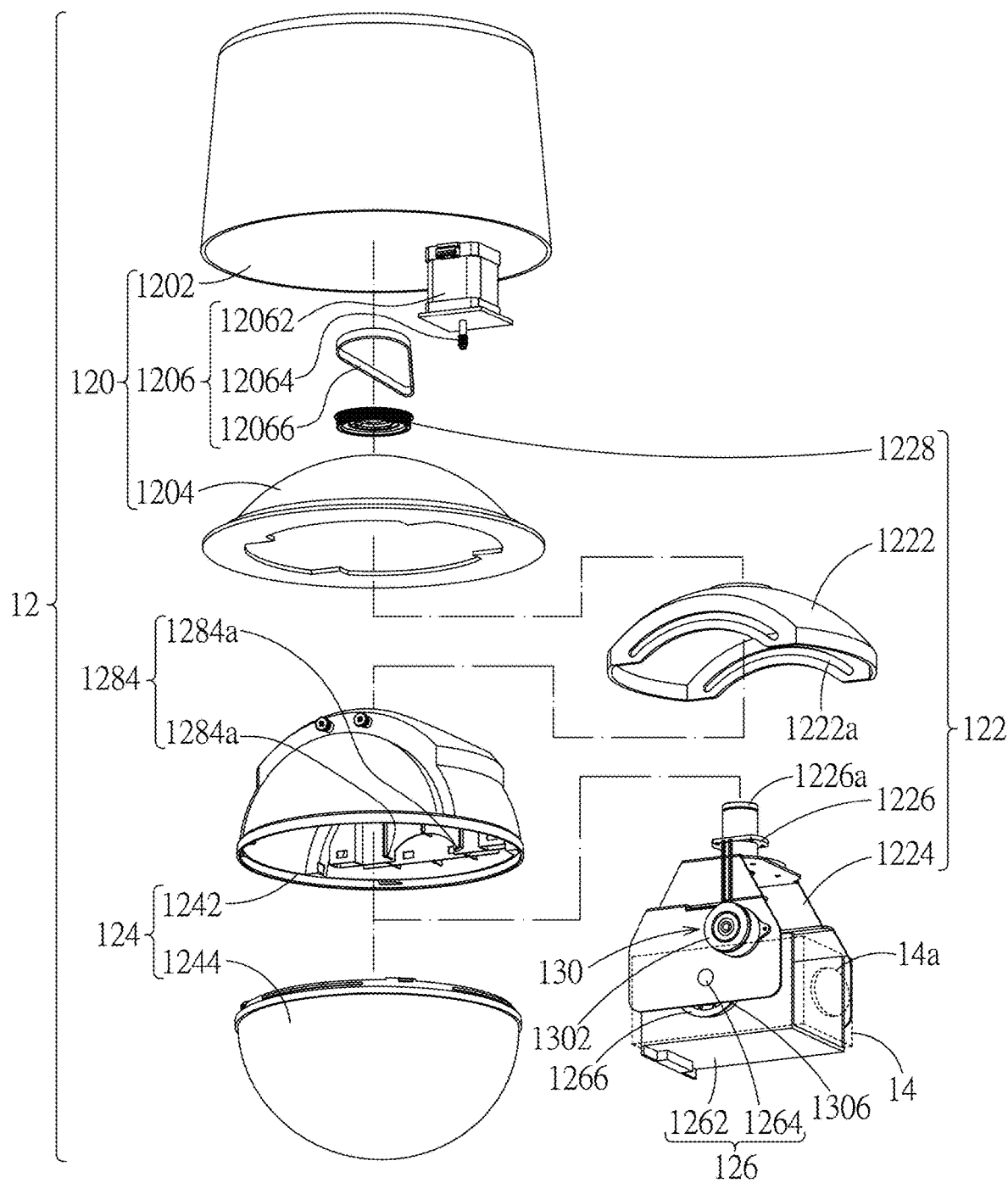
FIG. 3 is a partially exploded view of the camera in FIG. 1 in another viewpoint.
Figure 4:
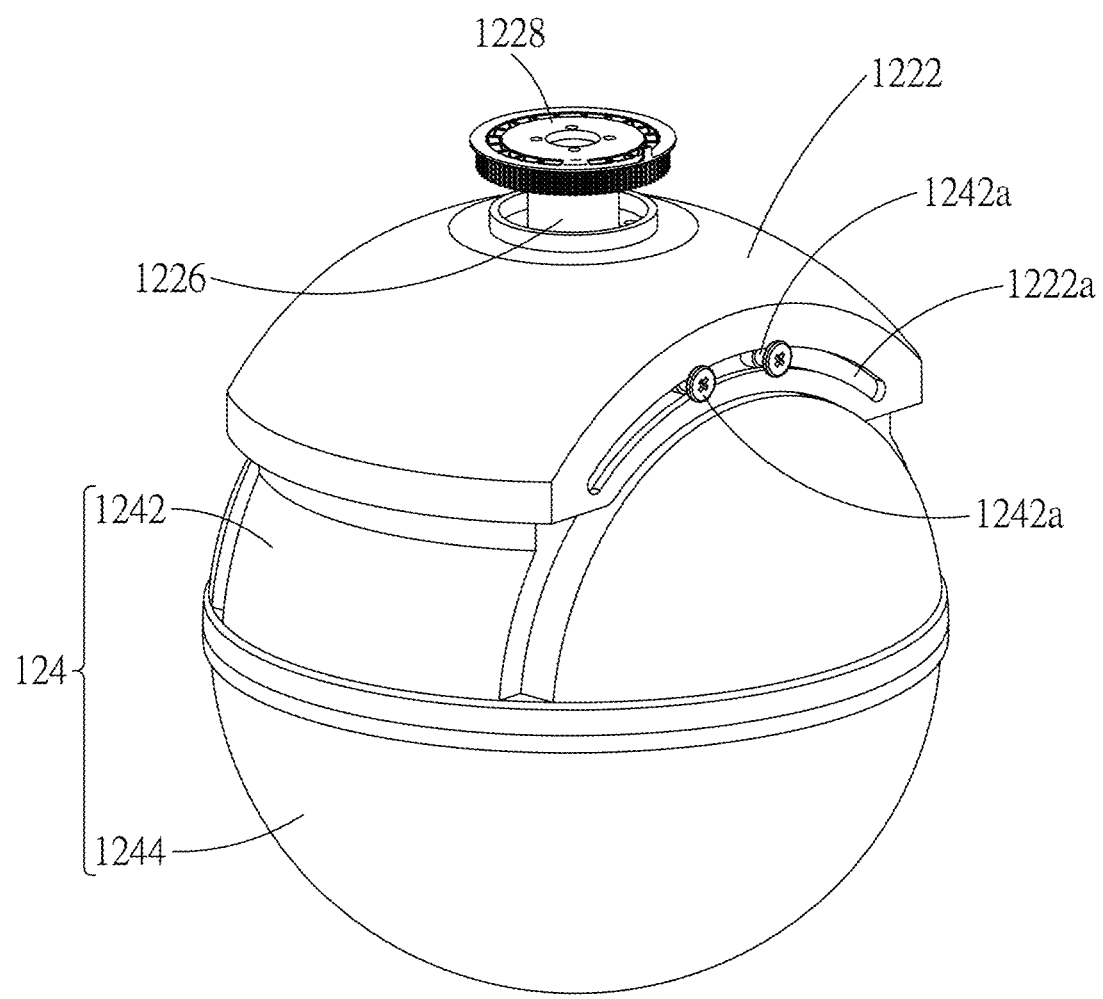
FIG. 4 is a schematic diagram illustrating the combination of a supporting frame and an outer casing of the camera in FIG. 1.
Figure 5:
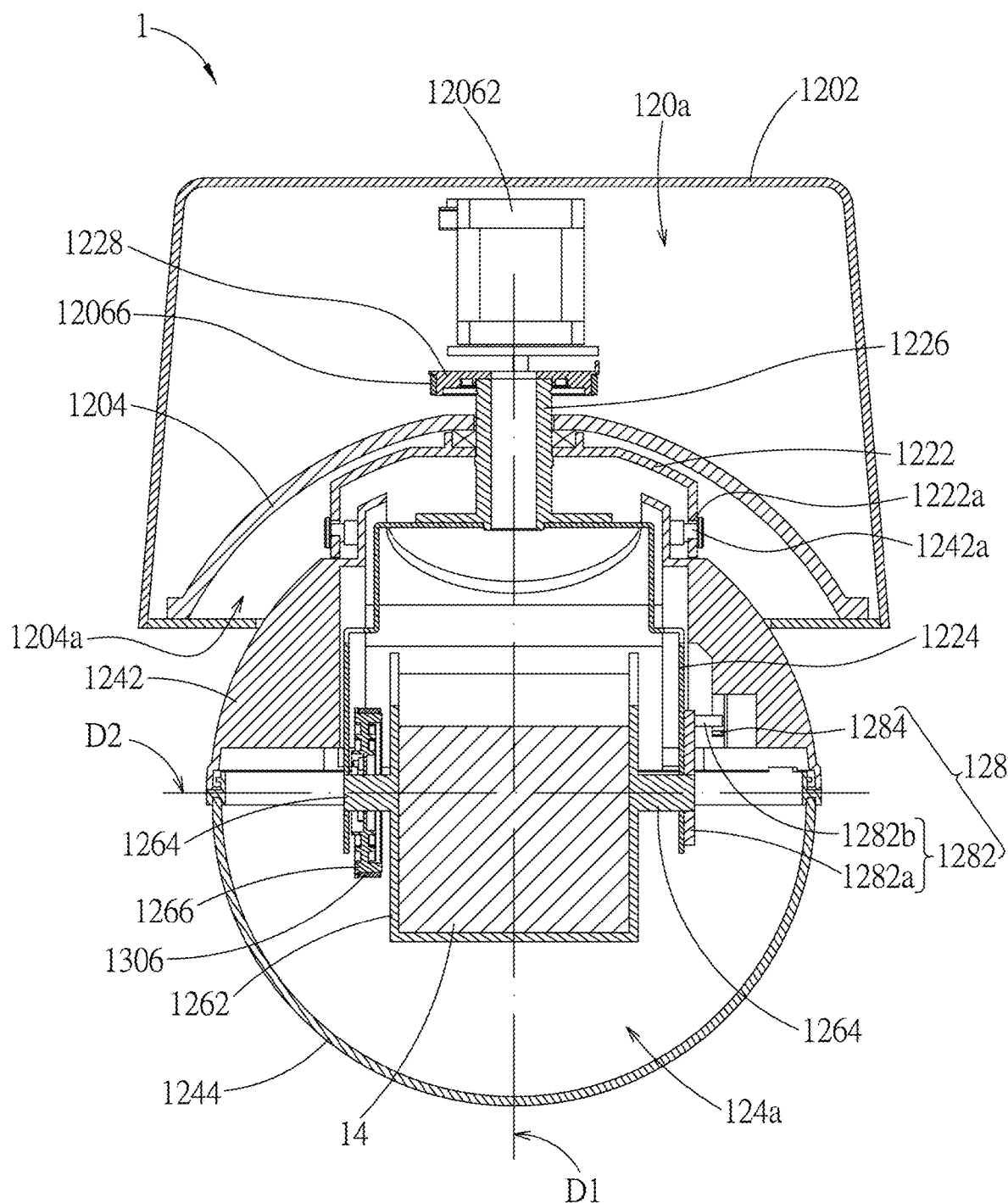
FIG. 5 is a sectional view of the camera along the line X-X in FIG. 1.
Figure 6:
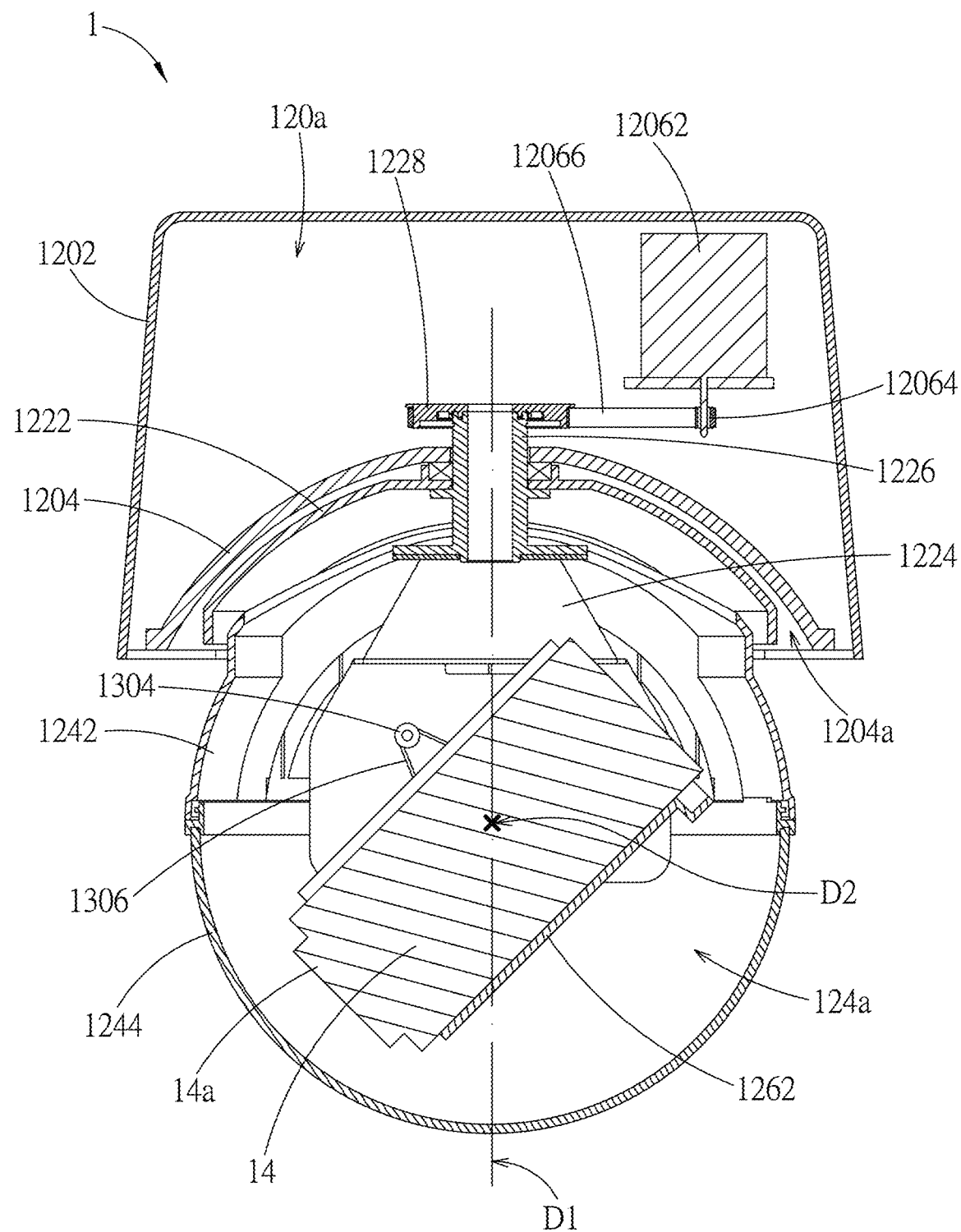
FIG. 6 is a sectional view of the camera along the line Y-Y in FIG. 1.

Please refer to FIG. 1 to FIG. 6. A camera 1 according to an embodiment includes a camera supporting device 12 an image-capturing device 14 (basically shown as a single rectangular box in the figures for drawing simplification; in practice, it can be, but not limited to, a camera using CCD) disposed in the camera supporting device 12. The camera supporting device 12 includes a device base 120, a supporting frame 122, an outer casing 124, a camera holding structure 126, and a linkage mechanism 128. The supporting frame 122 is connected to the device base 120. The outer casing 124 is rotatably connected to the supporting frame 122. The camera holding structure 126 is independent of the outer casing 124 and rotatably connected to the supporting frame 122. The image-capturing device 14 is fixed to the camera holding structure 126 and captures external images through a transparent portion of the outer casing 124. The camera holding structure 126 is linked with the outer casing 124 through the linkage mechanism 128. Thereby, when the camera holding structure 126 rotates relative to the supporting frame 122, the camera holding structure 126 can drive the outer casing 124 through the linkage mechanism 128, so that under the structural restriction by the linkage mechanism 128, the outer casing 124 rotates in response to the rotation of the camera holding structure 126 to reduce the extent to which the outer casing 124 covers the image-capturing device 14. In other words, the camera holding structure 126 is linked with the outer casing 124 through the linkage mechanism 128, so that the outer casing 124 is no longer limited by the size of the transmissible portion, but can provide a wider angle range available for the image-capturing device 14 fixed on the camera holding structure 126 to capture external images. In actual applications, for example, the camera 1 can be fixed onto a wall, a ceiling, other structures, and so on through the device base 120 to function as a surveillance camera, or the camera 1 can be installed on a vehicle, e.g. as an unmanned aerial vehicle (in which, in practice, the device base 120 can be integrated with the structure of the vehicle).

Furthermore, in the embodiment, the device base 120 includes a base casing 1202, a cover 1204, and a driving device 1206. The cover 1204 is engaged with the base casing 1202 to form an accommodating space 120a. The driving device 1206 is disposed in the accommodating space 120a. The cover 1204 is recessed inward to form a recess 1204a, e.g. but not limited to a spherical concave surface. The supporting frame 122 is disposed in the recess 1204a and includes a base portion 1222, a supporting portion 1224, and a connection shaft 1226. Both the base portion 1222 and the supporting portion 1224 are fixed to the connection shaft 1226. The supporting frame 122 is connected to the device base 120 through the connection shaft 1226. The connection shaft 1226 is rotatably connected to the device base 120 and is rotatable about a vertical axis D1 (indicated by a chain line in FIG. 5 and FIG. 6) relative to the device base 120; therein, the connection shaft 1226 passes through the cover 1204 (e.g. but not limited to passing directly through a through hole at the center of the cover 1204 or being rotatably connected with the cover 1204 through a bearing) to be connected to the driving device 1206.

In the embodiment, for example but not limited to, the driving device 1206 includes a motor 12062, a driving pulley 12064, and a belt 12066. A driven pulley 1228 is fixed on an end portion 1226a of the connection shaft 1226 (e.g. but not limited to by tightly sleeving on the end portion 1226a). The driving pulley 12064 is fixed on the rotary shaft of the motor 12062 (e.g. but not limited to by tightly sleeving thereon). The belt 12066 wraps the driving pulley 12064 and the driven pulley 1228. The motor 12062 is controllable to drive the driving pulley 12064 to rotate to drive the driven pulley 1228 through the belt 12066 to rotate together with the connection shaft 1226. Thereby, the supporting frame 122 can be driven to rotate horizontally relative to the device base 120 (i.e. rotating about the vertical axis D1) by controlling the driving device 1206. In practice, the driving device 1206 also can drive the supporting frame 122 to horizontally rotate through a gear group or other transmission mechanisms, even by the connection shaft 1226 being directly fixedly connected with the rotary shaft of the motor 12062.

In the embodiment, the outer casing 124 includes a first casing 1242 and a second casing 1244. The first casing 1242 is engaged with the second casing 1244 to form an accommodating space 124a. The first casing 1242 is rotatably connected to the base portion 1222, so that the outer casing 124 is rotatable relative to the supporting frame 122. Therein, the base portion 1222 includes two curved guiding slots 1222a. The first casing 1242 includes a plurality of guiding protrusions 1242a. The guiding protrusion 1242a is realized by a round post. Each curved guiding slot 1222a corresponds to a plurality of the round posts. The guiding protrusion 1242a is slidably disposed in the corresponding curved guiding slot 1222a. In practice, the guiding protrusion 1242a also can be realized by a curved protruding block. It is practicable that each curved guiding slot 1222a can correspond to one curved protruding block. Furthermore, the curved guiding slots 1222a and the guiding protrusions 1242a also can be arranged in reverse to be on the first casing 1242 and the base portion 1222, which also can make the outer casing 124 rotatable relative to the supporting frame 122. Furthermore, in practice, the first casing 1242 can also be rotatably connected to the base portion 1222 by other guiding or limiting structures; for example, one of the base portion 1222 and the first casing 1242 includes two parallel spherical shells, and the other of the base portion 1222 and the first casing 1242 includes a corresponding spherical shell that slides between the two parallel spherical shells. The three spherical shells have the same center of curvature. This structural configuration also can achieve the effect that first casing 1242 can rotate relative to the base portion 1222.

Furthermore, in the embodiment, the base portion 1222 and the supporting portion 1224 are located at two sides of the first casing 1242 (or the outer casing 124) respectively. That is, the supporting portion 1224 is located in the accommodating space 124a of the outer casing 124, and the connection shaft 1226 passes through the first casing 1242 to be connected to the base portion 1222 and the supporting portion 1224. However, it is not limited thereto. For example, both the base portion 1222 and the supporting portion 1224 are located in the accommodating space 124a of the outer casing 124. The connection shaft 1226 passes through the first casing 1242 to be rotatably connected to the device base 120. The outer casing 124 still can rotate relative to the supporting frame 122 through the above disposition of the curved guiding slot 1222a and the guiding protrusion 1242a.

Figure 7:
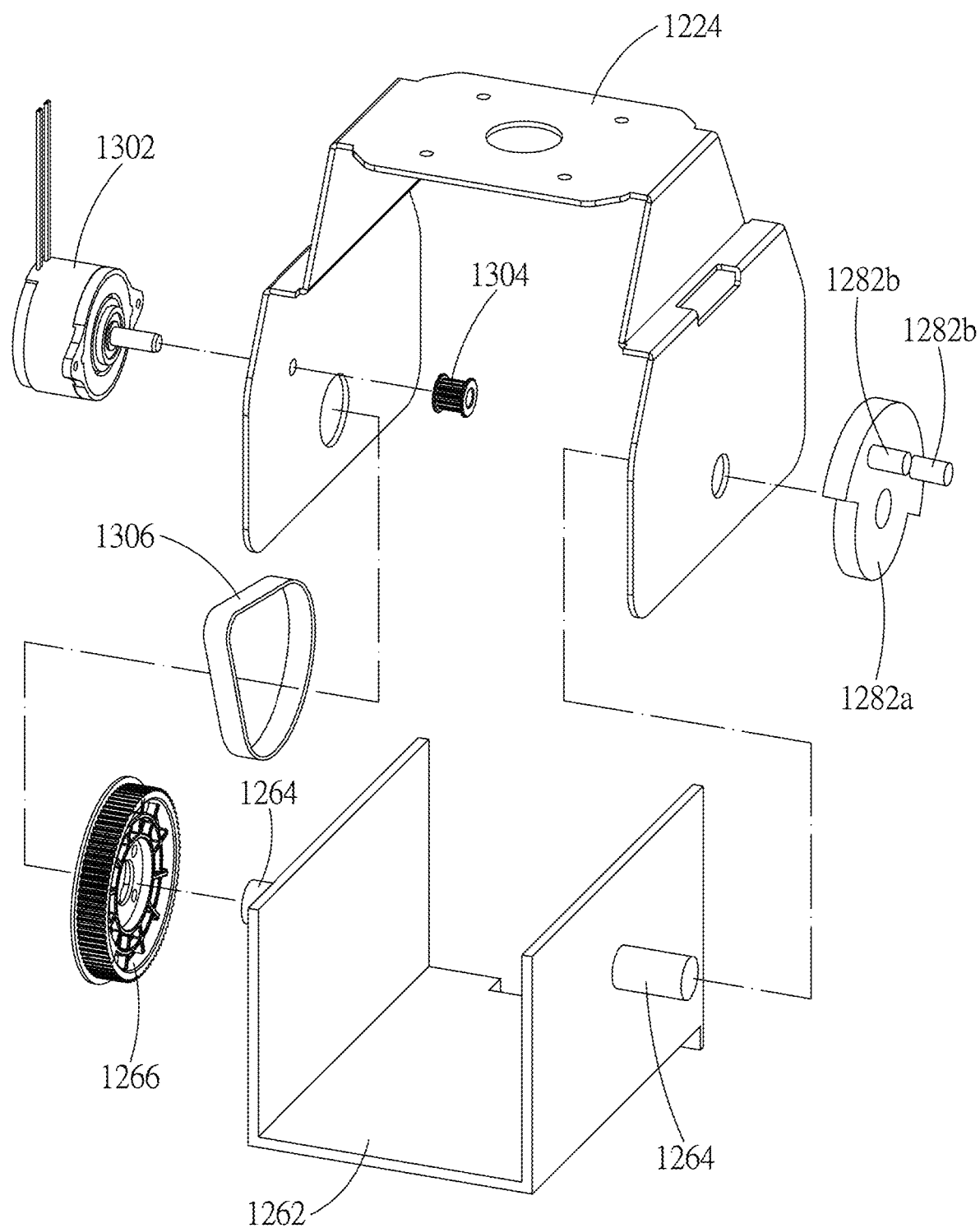
FIG. 7 is a partially exploded view of a supporting portion of the supporting frame and a camera holding structure in FIG. 2.

Please also refer to FIG. 7. In the embodiment, the camera holding structure 126 is located in the accommodating space 124a of the outer casing 124 and includes a carrier frame 1262 and two shaft portions 1264 protruding outward from two sides of the carrier frame 1262. The supporting portion 1224 has an n-shaped structure. The camera holding structure 126 is rotatably connected to the inside of the n-shaped structure of the supporting portion 1224 through the shaft portions 1264 and therefore can rotate about a horizontal axis D2 (indicated by a chain line in FIG. 5 and by a cross mark in FIG. 6) relative to the supporting frame 122. The image-capturing device 14 is fixed on the carrier frame 1262, so that the lens 14a of the image-capturing device 14 faces a light-permeable portion of the outer casing 124 to make the image-capturing device 14 be able to capture external images through the light-permeable portion. Therein, in the embodiment, the outer casing 124 as a whole roughly shows a sphere. The horizontal axis D2 substantially passes through the center of the sphere. The second casing 1244 roughly shows a hemisphere and is made of light-permeable material to form a light-permeable cover as the light-permeable portion; however, it is not limited thereto in practice. For example, only a portion of the second casing 1244 is made of light-permeable material to function as the light-permeable portion. For another example, the outer casing 124 is not limited to be spherical. When the image-capturing device 14 rotates with the carrier frame 1262 relative to the supporting frame 122 (or the supporting portion 1224 thereof), the distance between the lens 14a and the light-permeable portion of the outer casing 124 along the optical axis of the lens 14a remains substantially the same, which can reduce or eliminate the distortion of the captured images. In addition, in practice, the image capturing device 14 can be structurally integrated with the camera holding structure 126. For example, the shaft portions 1264. For example, the shaft portions 1264 directly protrude from the device casing of the image-capturing device 14; therein, the carrier frame 1262 can be omitted. This structural configuration also can make the image-capturing device 14 be able to rotate relative to the supporting frame 122.

In the embodiment, the linkage mechanism 128 includes a driving part 1282 and a driven part 1284 kinematically connected to the driving part 1282. The driving part 1282 is fixedly connected to the camera holding structure 126. The driven part 1284 is fixedly connected to the outer casing 124. The camera holding structure 126 is linked with the outer casing 124 through the linkage mechanism 128, so that the image-capturing device 14 rotates with the carrier frame 1262 relative to the supporting frame 122 (or the supporting portion 1224 thereof), the camera holding structure 126 drives the outer casing 124 through the linkage mechanism 128. For more details, in the embodiment, the driving part 1282 is fixedly disposed on one of the shaft portions 1264 and located at the outside the n-shaped structure of the supporting portion 1224. The driven part 1284 is disposed at the inside the first casing 1242 (i.e. in the accommodating space 124a of the outer casing 124). The driving part 1282 includes a connection portion 1282a and a protrusion 1282b. The connection portion 1282a is fixed on the shaft portion 1264 (e.g. but not limited to by tightly sleeving on the shaft portion 1264). The protrusion 1282b protrudes from the connection portion 1282a parallel to the horizontal axis D2 and can be realized by, but not limited to, two protruding posts, so that the protrusion 1282b and the shaft portion 1264 rotate together. The driven part 1284 includes two pushing portions 1284a, which are realized by, but not limited to, rib plates at the inside of the first casing 1242. The protrusion 1282b is limitedly disposed between the two pushing portions, so that the driving part 1282 and the driven part 1284 are mutually driven by the protrusion 1282b selectively abutting the two pushing portions 1284a.

Figure 8:
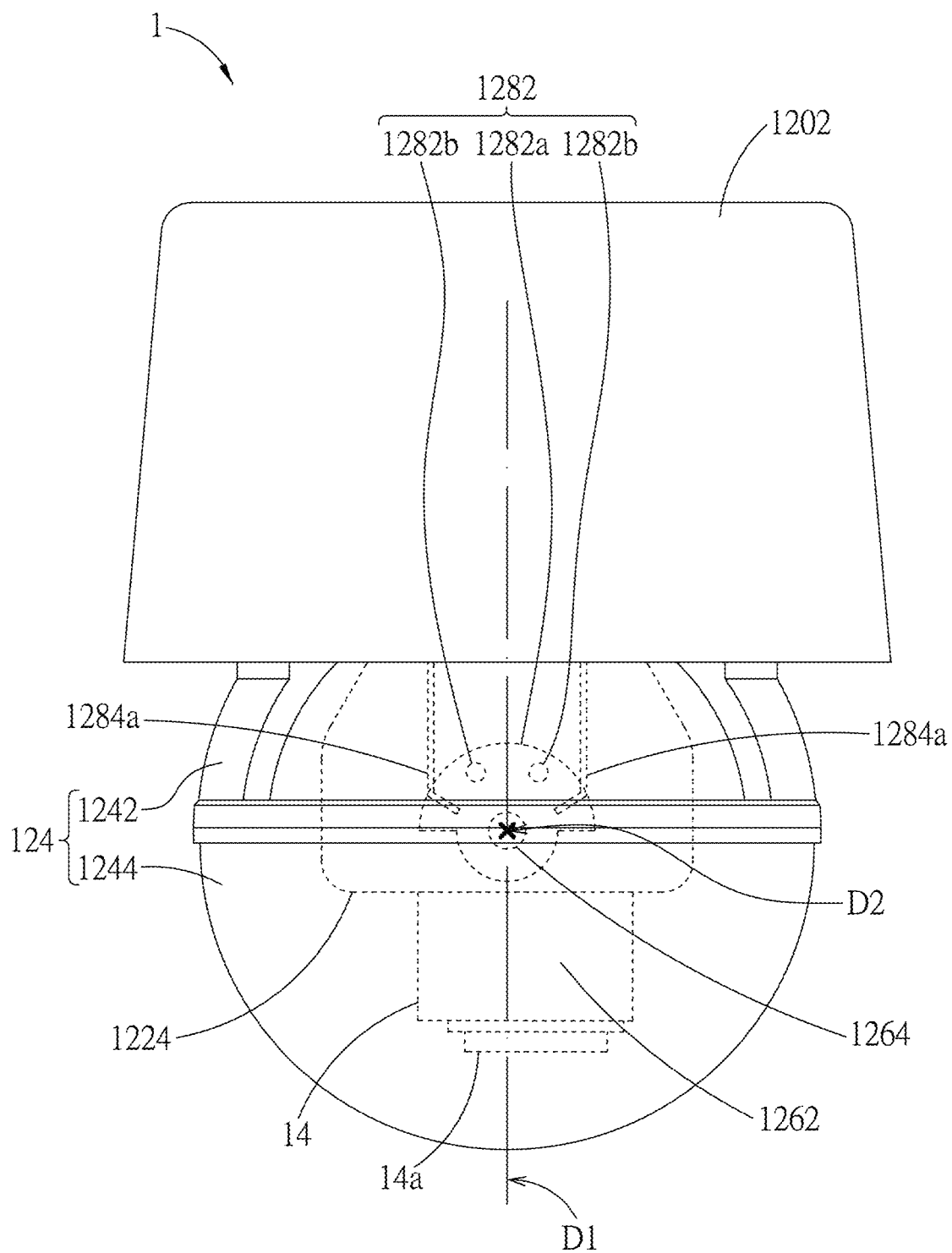
FIG. 8 is a side view of the camera in FIG. 1; therein, partial profiles of the supporting portion, a carrier frame, a driving part, a driven part, and an image-capturing device are shown in dotted lines.
Figure 9:
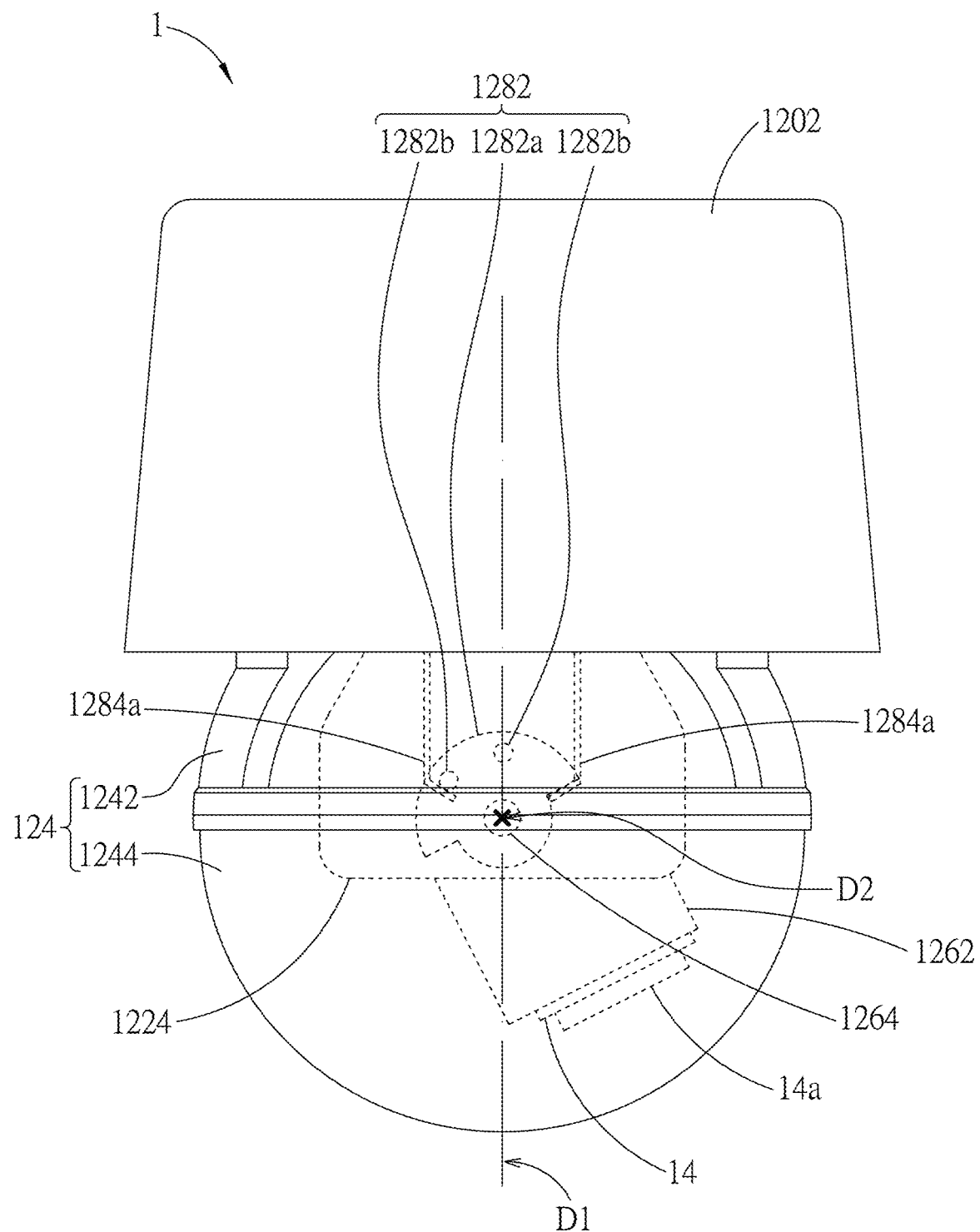
FIG. 9 is a side view of the camera in FIG. 8 in which the carrier frame and the image-capturing device together are rotated by an angle.
Figure 10:
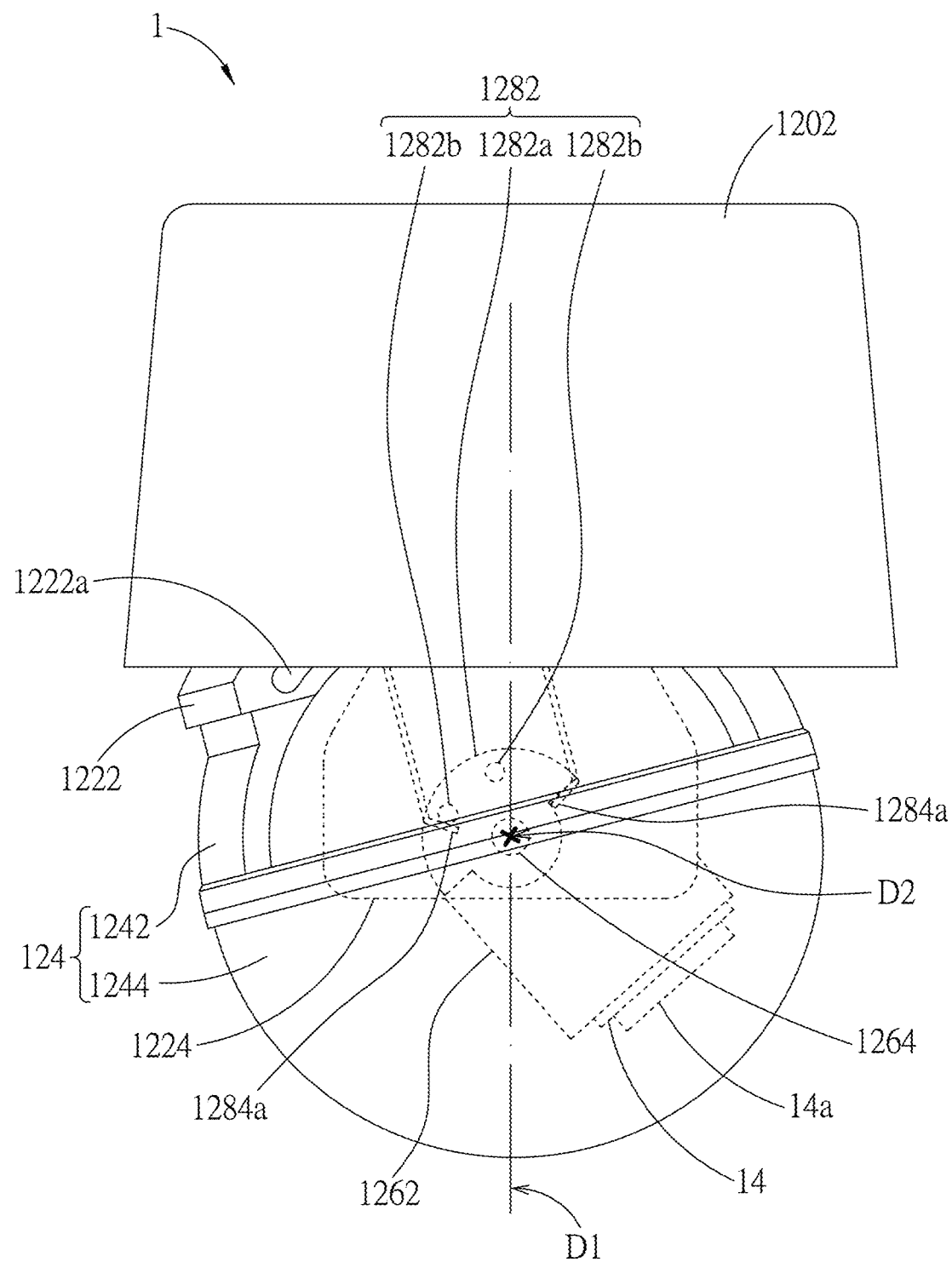
FIG. 10 is a side view of the camera in FIG. 9 in which the carrier frame and the image-capturing device together are continued to be rotated by an angle.

Please refer to FIG. 8 to FIG. 11. As shown by FIG. 8, in the viewpoint of FIG. 8, the protrusion 1282b does not touch the pushing portions 1284a; that is, gaps exist between the protrusion 1282b and the pushing portions 1284a. Therefore, at the moment, the protrusion 1282b still can keep not touching the pushing portions 1284a even after the camera holding structure 126 rotates a small angle to the left or right. In other words, at the moment, the image-capturing device 14 (fixed on the carrier frame 1262 of the camera holding structure 126) is rotatable in independently of the outer casing 124 (i.e. capable of rotating relative to the outer casing 124 while the outer casing 124 is fixed). By designing the size of the light-permeable portion of the outer casing 124 (or the second casing 1244), the lens 14a of the image-capturing device 14 can face the middle area of the light-permeable portion, which can effectively reduce or eliminate the distortion of the captured images. As shown by FIG. 9, the camera holding structure 126 rotates to the left until the protrusion 1282b (or the left protruding post) abuts against the (left) pushing portion 1284a. If the camera holding structure 126 continues rotating leftward, the protrusion 1282b will push the pushing portion 1284a to move, so that the outer casing 124 and the camera holding structure 126 rotate together at the same speed, as shown by FIG. 10. Thereby, the lens 14a of the image-capturing device 14 should not face or be too close to the marginal area of the light-permeable portion (or the second casing 1244) leading to distortion of the captured images.

Figure 11:
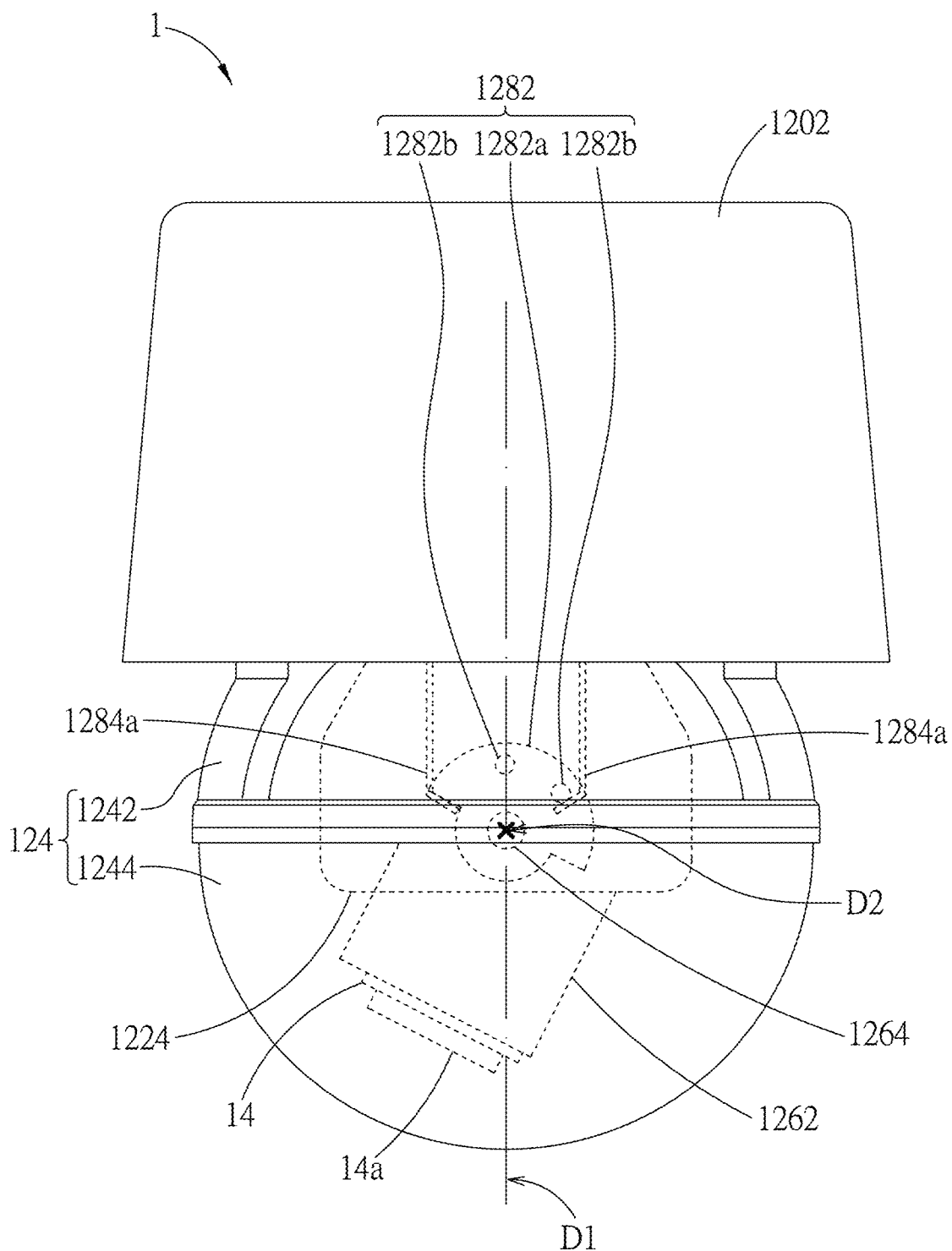
FIG. 11 is a side view of the camera in FIG. 8 in which the carrier frame and the image-capturing device together are rotated in another rotation direction by an angle.

Similarly, as shown by FIG. 11, the camera holding structure 126 rotates to the right until the protrusion 1282b (or the right protruding post) abuts against the (right) pushing portion 1284a. If the camera holding structure 126 continues rotating rightward, the protrusion 1282b will push the pushing portion 1284a to move, so that the outer casing 124 and the camera holding structure 126 rotate together at the same speed (of which the action is similar to that shown by FIG. 9 and FIG. 10 and is not shown additionally). Thereby, the lens 14a of the image-capturing device 14 should not face or be too close to the marginal area of the light-permeable portion (or the second casing 1244) leading to distortion of the captured images. Therefore, in the embodiment, through the linkage effect of the linkage mechanism 128 on the outer casing 124 and the camera holding structure 126, in practice, the angle range of the rotation of the image-capturing device 14 about the horizontal axis D2 can be greater than 180 degrees without being restricted by the size of the light-permeable portion (or the second casing 1244). In addition, in practice, a buffer material (e.g. but not limited to foam, rubber, spring, etc.) can be placed between the protrusion 1282b and the pushing portion 1284a for absorbing the energy when the protrusion 1282b collides with the pushing portion 1284a, which can eliminate or reduce the vibration when the camera holding structure 126 drives the outer casing 124 to move through the linkage mechanism 128.

Furthermore, in the embodiment, the camera supporting device 12 also includes a driving device 130 engaged with the camera holding structure 126. The driving device 130 is controllable to drive the camera holding structure 126 to rotate, so that the camera holding structure 126 can drive the outer casing 124 to rotate through the linkage mechanism 128. For more details, in the embodiment, the driving device 130 includes a motor 1302, a driving pulley 1304, and a belt 1306. The camera holding structure 126 includes a driven pulley 1266. The motor 1302 is fixed to the supporting portion 1224. The driving pulley 1304 is fixed on the rotary shaft of the motor 1302 (e.g. but not limited to by tightly sleeving thereon). The driven pulley 1266 is fixed on the shaft portion 1264 (e.g. but not limited to by tightly sleeving thereon). The belt 1306 wraps the driving pulley 1304 and the driven pulley 1266. The motor 1302 is controllable to drive the driving pulley 1304 to rotate and drive the driven pulley 1266 through the belt 1306 to rotate together with the shaft portion 1264 and the carrier frame 1262 (or the camera holding structure 126 thereof). Therein, through the linkage mechanism 128, the outer casing 124 is controlled to rotate by the driving device 130. Furthermore, in practice, the driving device 130 also can drive the camera holding structure 126 to vertically rotate (i.e. rotating about the horizontal axis D2) through a gear group or other transmission mechanisms, even by the shaft portion 12646 being directly fixedly connected with the rotary shaft of the motor 1302.

As described above, in the camera 1, the horizontal axis D2 is perpendicular to the vertical axis D1. The camera 1 provides image-capturing device 14 with controllable panning through the driving device 1206 and also provides the image-capturing device 14 with controllable vertical tilting through the driving device 130. However, it is not limited thereto in practice. Furthermore, in practice, other components of the camera 1 (e.g. a control module or other electronic components, which are not shown in the figures) can be accommodated in the accommodating space 120a of the device base 120. Furthermore, in practice, the camera 1 can further include a circular flexible dustproof rubber cover (not shown in the figures), connected to and between the cover 1204 and the first casing 1242 (or the base portion 1222). The connection shaft 1226 of the supporting frame 122 passes through the circular flexible dustproof rubber cover. The circular flexible dustproof rubber cover can provide a certain degree of waterproof and dustproof effect.

Figure 12:
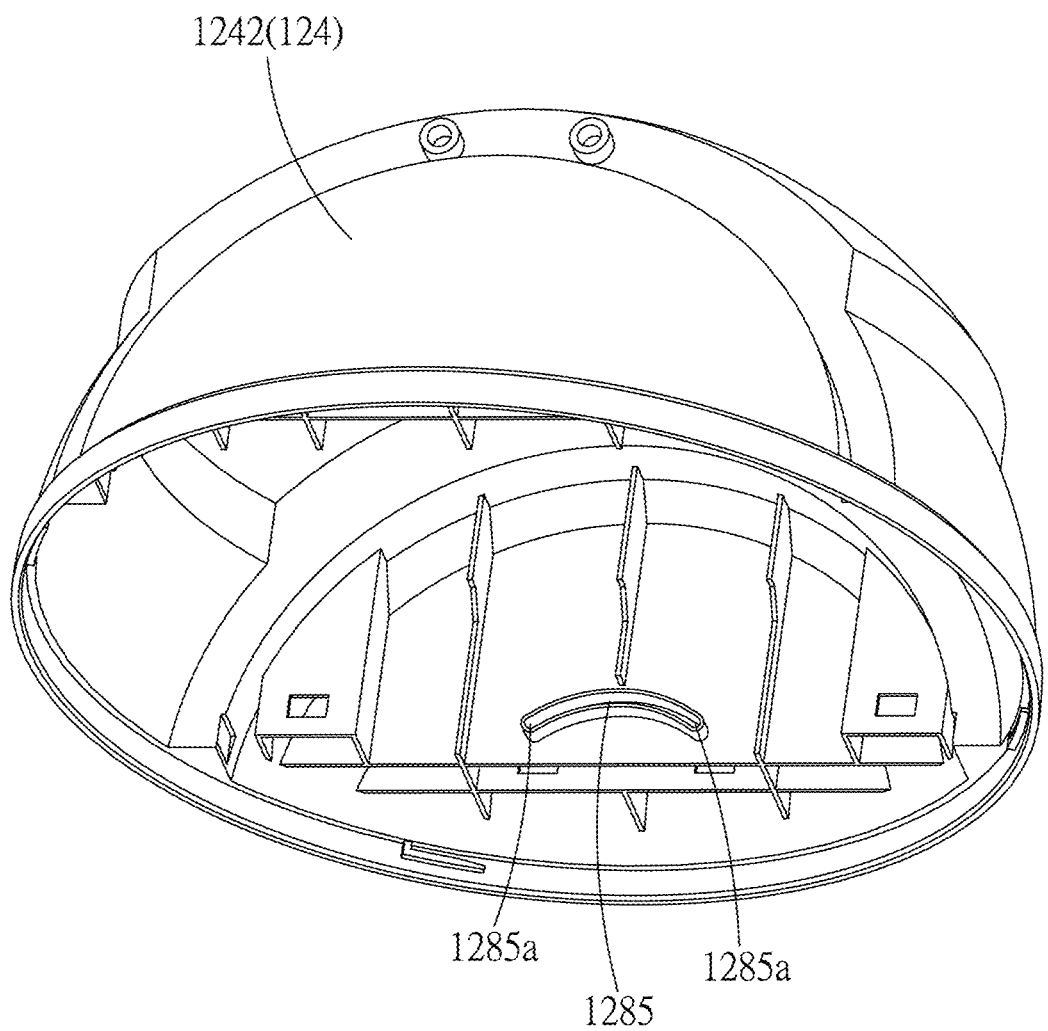
FIG. 12 is a schematic diagram illustrating a first casing according to another embodiment.
Figure 13:
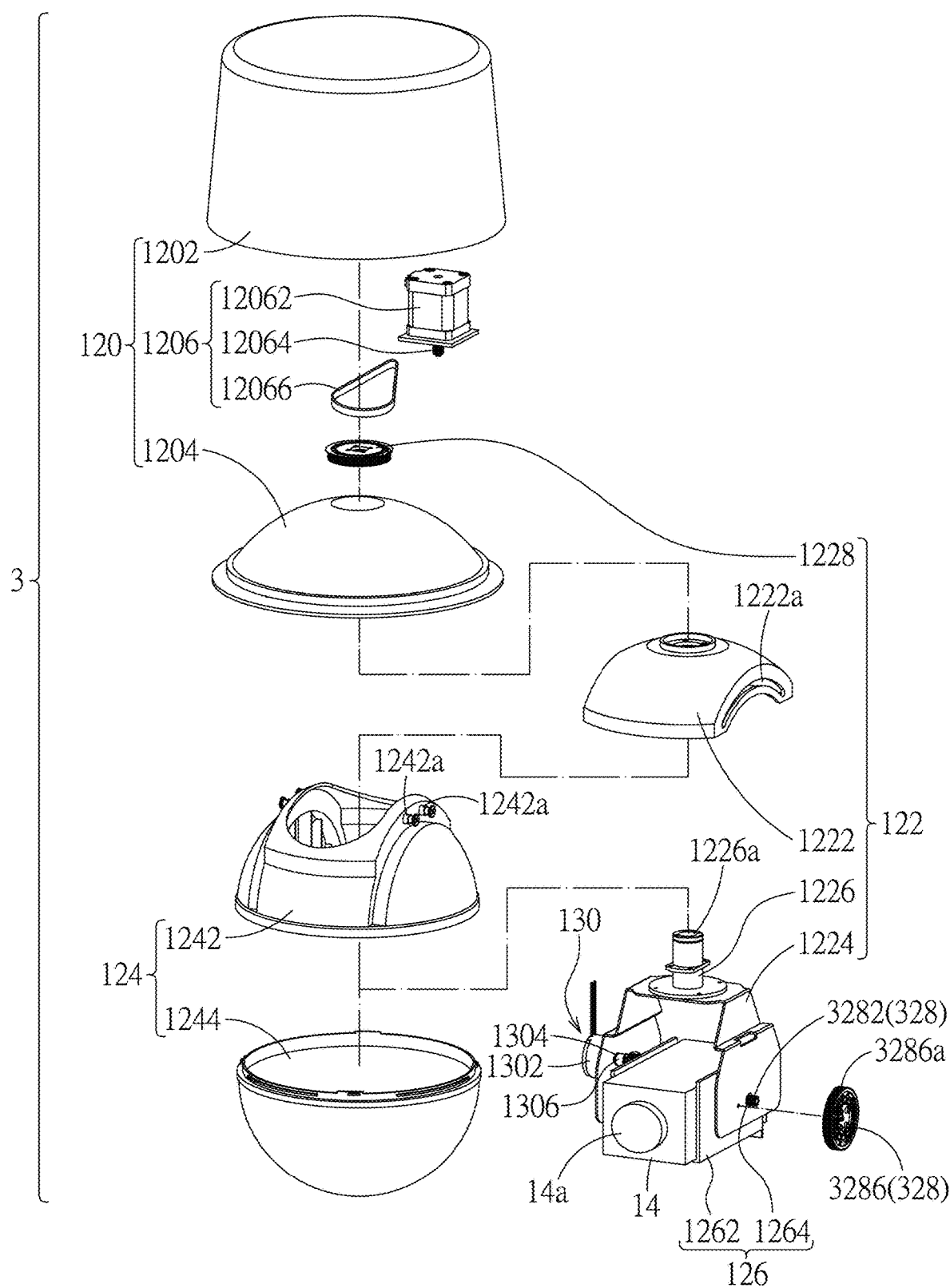
FIG. 13 is a partially exploded view of a camera according to another embodiment.
Figure 14:
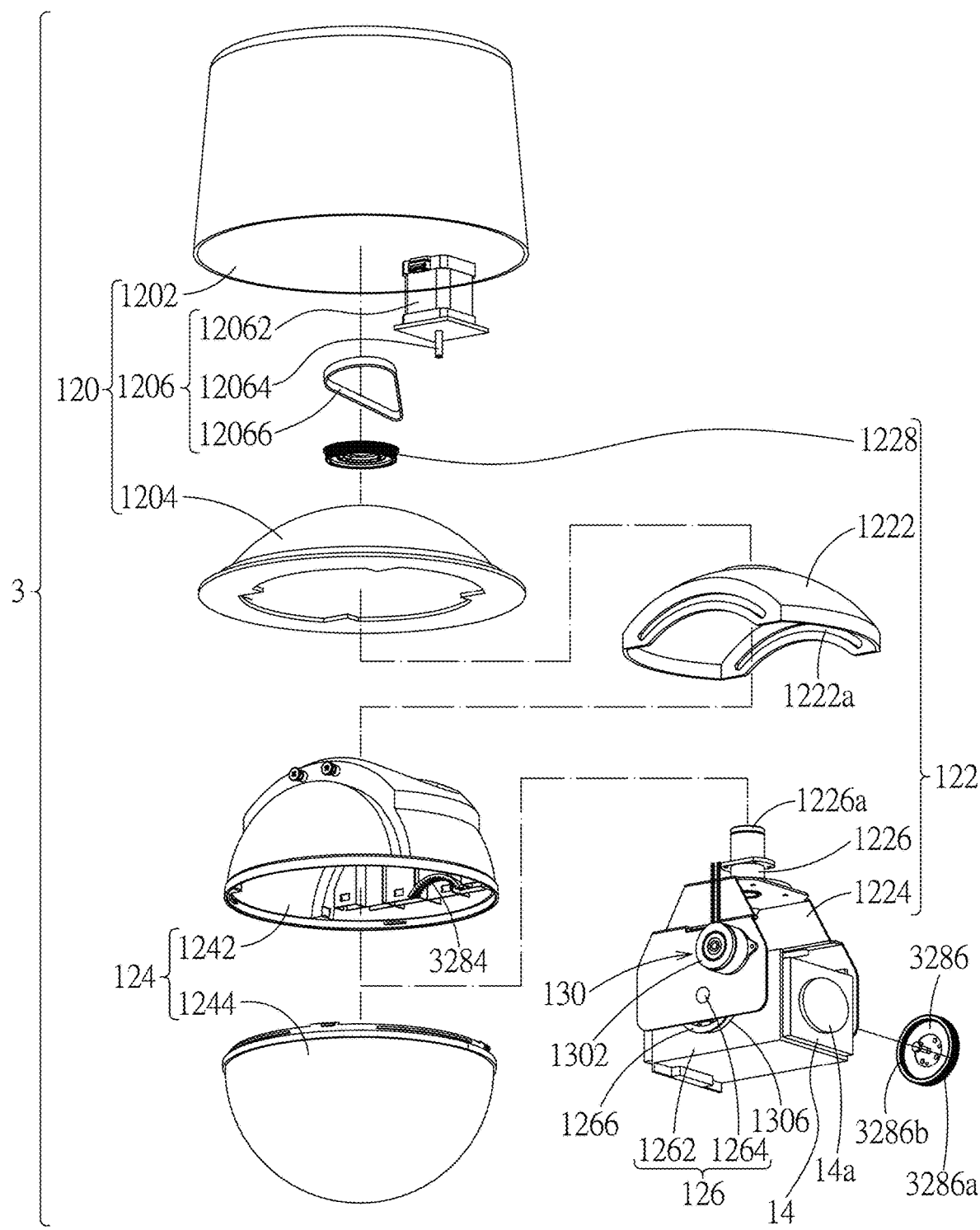
FIG. 14 is a partially exploded view of the camera in FIG. 13 in another view point.
Figure 15:
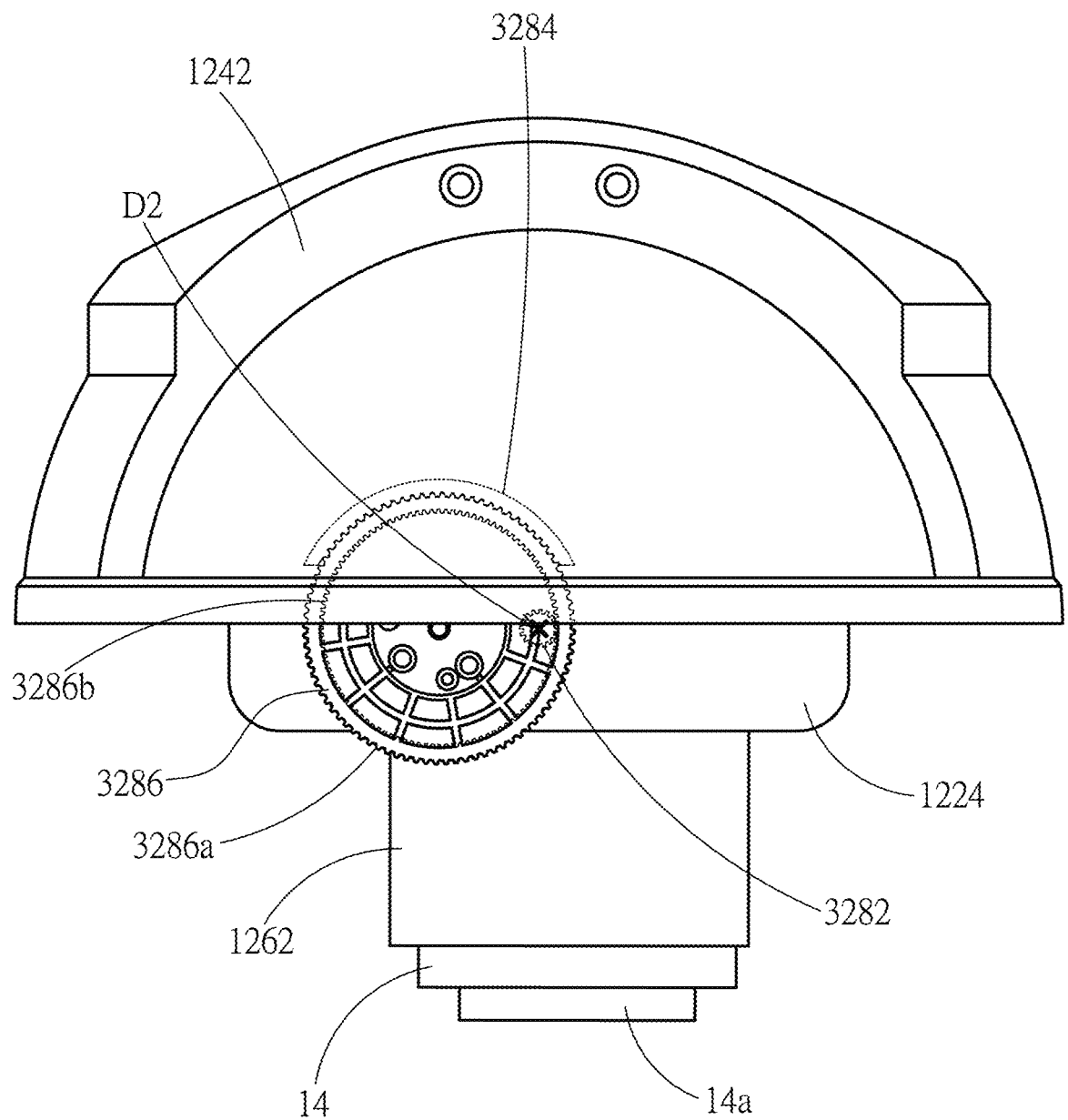
FIG. 15 is a side view of a linkage mechanism in FIG. 13; therein, a driving part and an intermediate gear are shown in dashed lines.

In addition, in practice, the two pushing portions 1284a also can be realized by two end portions 1285a of a sliding slot 1285, as shown by FIG. 12. Therein, the protrusion 1282b is relatively slidably disposed in the sliding slot 1285. Furthermore, in practice, the protrusion 1282b and the two pushing portions 1284a also can be arranged in reverse to be on the first casing 1242 and the camera holding structure 126 (e.g. the shaft portion 1264 thereof), which also can realize the linkage between the outer casing 124 and the camera holding structure 126 as described above. Furthermore, in practice, the linkage mechanism 128 is not limited to the abovementioned structural configuration, and can be realized by other mechanisms capable of linking the outer casing 124 and the holding structure 126. For example, as shown by FIG. 13 to FIG. 15, a camera 3 according to another embodiment is structurally similar to the camera 1. For description simplification, the camera 3 uses the reference numbers of the camera 1 in practice. For other descriptions about the camera 3, please refer to the relevant descriptions of the camera 1 and variations thereof, which will not be repeated in addition.

Compared with the camera 1, a linkage mechanism 328 of the camera 3 includes a driving part 3282, a driven part 3284, and an intermediate gear 3286. The driving part 3282 is fixedly connected to the camera holding structure 126 (or the shaft portion 1264 thereof). The driven part 3284 is fixedly connected to the outer casing 124 (or the first casing 1242 thereof). The driving part 3282 is connected to the driven part 3284 through the intermediate gear 3286. Therein, the intermediate gear 3286 is pivotally connected to the supporting frame 122 (or the supporting portion 1224 thereof). The intermediate gear 3286 includes a plurality of outer teeth 3286a and a plurality of inner teeth 3286b. The driving part 3282 meshes with the inner teeth 3286b. The driven part 3284 meshes with the outer teeth 3286a. In the embodiment, the driving part 3282 is realized by a pinion, fixed on the shaft portion 1264 (e.g. but not limited to by tightly sleeving on the shaft portion 1264). The intermediate gear 3286 is realized by a ring gear in structural logic. The driven part 3284 is realized by a section of an inner gear and is structurally integrated with the first casing 1242. By designing the gear parameters (e.g. pitch diameter) of the driving part 3282, the intermediate gear 3286 (or the outer teeth 3286a and inner teeth 3286b thereof), and the driven part 3284, the ratio of the rotation angles of the driving part 3282 and the driven part 3284 can be controlled. For example, but not limited thereto, the carrier frame 1262 rotates with the image-capturing device 14 and the driving part 3282 by an angle, and the driven part 3284 rotates with the outer casing 124 in the same direction by one-third of the angle.

In the embodiment, the camera holding structure 126 and the outer casing 124 simultaneously rotate in the same direction at different speeds. The rotation speed of the camera holding structure 126 is larger than that of the outer casing 124. Similarly, in the camera 3, through the linkage effect of the linkage mechanism 328, in practice, the angle range of the rotation of the image-capturing device 14 about the horizontal axis D2 can be greater than 180 degrees without being restricted by the size of the light-permeable portion (or the second casing 1244). Furthermore, in the embodiment, the driving part 3282 can be realized by an external gear formed directly on the shaft portion 1264. Furthermore, the angle range of the rotation of the driving part 3282 in an application may be less than one circle, so the driving part 3282 is not limited to be a complete pinion and the intermediate gear 3286 is also not limited to be a complete ring gear. In this case, the linkage mechanism 328 still can effectively and accurately transmit motion between the camera holding structure 126 and the outer casing 124. In addition, in practice, the linkage mechanism 328 also can be realized by other gear combinations. For example, the intermediate gear 3286 is replaced by two spur gears which mesh with each other and are pivotally connected to the supporting portion 1224. The driving part 3282 meshes with one of the spur gears, and the driven part 3284 meshes with the other one of the spur gears. Thereby, the driving part 3282 and the driven part 3284 are linked. Designing the parameters of the spur gears also can realized the linkage effect of the camera holding structure 126 on the outer casing 124 as described above. For another example, the intermediate gear 3286 is replaced by two spur gears which are fixedly connected in series and pivotally connected to the supporting portion 1224. The driving part 3282 meshes with one of the spur gears, and the driven part 3284 meshes with the other one of the spur gears. Thereby, the driving part 3282 and the driven part 3284 are linked. Designing the parameters of the spur gears also can realized the linkage effect of the camera holding structure 126 on the outer casing 124 as described above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A camera supporting device, comprising:
   a supporting frame;
   an outer casing, rotatably connected to the supporting frame;
   a camera holding structure, independent of the outer casing and rotatably connected to the supporting frame; and
   a linkage mechanism, comprising a driving part and a driven part kinematically connected to the driving part, the driving part being fixedly connected to the camera holding structure, the driven part being fixedly connected to the outer casing;
   wherein the camera holding structure is linked with the outer casing through the linkage mechanism, and the camera holding structure as a whole and the outer casing simultaneously rotate at different speeds.

2. The camera supporting device according to claim 1, further comprising a driving device, wherein the driving device is engaged with the camera holding structure, and the driving device is controllable to drive the camera holding structure to rotate, so that the camera holding structure drives the outer casing to rotate through the linkage mechanism.

3. The camera supporting device according to claim 1, wherein one of the driving part and the driven part comprises a protrusion, the other of the driving part and the driven part comprises two pushing portions, the protrusion is limitedly disposed between the two pushing portions, and the driving part and the driven part are mutually driven by the protrusion selectively abutting the two pushing portions.

4. The camera supporting device according to claim 1, wherein the driving part and the driven part are kinematically connected through at least one gear.

5. The camera supporting device according to claim 1, wherein the linkage mechanism comprises an intermediate gear, the intermediate gear comprises a plurality of outer teeth and a plurality of inner teeth, the driving part meshes with the plurality of inner teeth, and the driven part meshes with the plurality of outer teeth.

6. The camera supporting device according to claim 1, wherein one of the supporting frame and the outer casing comprises a curved guiding slot, the other of the supporting frame and the outer casing comprises a guiding protrusion, and the guiding protrusion is relatively slidably disposed in the curved guiding slot.

7. The camera supporting device according to claim 1, further comprising a device base, wherein the supporting frame is rotatably connected to the device base and rotates about a vertical axis relative to the device base, and the camera holding structure rotates about a horizontal axis relative to the supporting frame.

8. The camera supporting device according to claim 1, wherein the supporting frame comprises a base portion and a supporting portion fixedly connected to the base portion, the outer casing is rotatably connected to the base portion, the base portion and the supporting portion are located at two sides of the outer casing respectively, and the camera holding structure is rotatably connected to the supporting portion.

9. A camera, comprising:
   a camera supporting device, comprising:
      a supporting frame;
      an outer casing, rotatably connected to the supporting frame, the outer casing has a light-permeable cover;
      a camera holding structure, independent of the outer casing and rotatably connected to the supporting frame, the camera holding structure comprising a carrier frame, the carrier frame being rotatably connected to the supporting frame; and
      a linkage mechanism, comprising a driving part and a driven part kinematically connected to the driving part, the driving part being fixedly connected to the carrier frame of the camera holding structure, the driven part being fixedly connected to the outer casing, the camera holding structure being linked with the outer casing through the linkage mechanism; and
   an image-capturing device, fixedly on the carrier frame of the camera holding structure, the image-capturing device comprising a lens, the lens facing the light-permeable cover so that the image-capturing device captures external images through the light-permeable cover.

10. The camera according to claim 9, wherein the camera supporting device comprises a driving device, the driving device is engaged with the camera holding structure, and the driving device is controllable to drive the camera holding structure to rotate, so that the camera holding structure drives the outer casing to rotate through the linkage mechanism.

11. The camera according to claim 9, wherein one of the driving part and the driven part comprises a protrusion, the other of the driving part and the driven part comprises two pushing portions, the protrusion is limitedly disposed between the two pushing portions, and the driving part and the driven part are mutually driven by the protrusion selectively abutting the two pushing portions.

12. The camera according to claim 9, wherein the driving part and the driven part are kinematically connected through at least one gear.

13. The camera according to claim 9, wherein the linkage mechanism comprises an intermediate gear, the intermediate gear comprises a plurality of outer teeth and a plurality of inner teeth, the driving part meshes with the plurality of inner teeth, and the driven part meshes with the plurality of outer teeth.

14. The camera according to claim 9, wherein one of the supporting frame and the outer casing comprises a curved guiding slot, the other of the supporting frame and the outer casing comprises a guiding protrusion, and the guiding protrusion is relatively slidably disposed in the curved guiding slot.

15. A camera, comprising:
   a camera supporting device, comprising:
      a supporting frame;
      an outer casing, rotatably connected to the supporting frame, the outer casing has a light-permeable cover, one of the supporting frame and the outer casing comprising a curved guiding slot, the other of the supporting frame and the outer casing comprising a guiding protrusion, the guiding protrusion being relatively slidably disposed in the curved guiding slot;
      a camera holding structure, independent of the outer casing and rotatably connected to the supporting frame; and
      a linkage mechanism, comprising a driving part and a driven part kinematically connected to the driving part, the driving part being fixedly connected to the camera holding structure, the driven part being fixedly connected to the outer casing, the camera holding structure being linked with the outer casing through the linkage mechanism; and an image-capturing device, fixedly on the camera holding structure, the image-capturing device comprising a lens, the lens facing the light-permeable cover so that the image-capturing device captures external images through the light-permeable cover.

16. The camera according to claim 15, wherein the camera holding structure comprises a carrier frame, the carrier frame is rotatably connected to the supporting frame, and the driving part is fixedly connected to the carrier frame, and the image-capturing device is fixed on the carrier frame.

17. The camera according to claim 15, wherein the camera supporting device comprises a driving device, the driving device is engaged with the camera holding structure, and the driving device is controllable to drive the camera holding structure to rotate, so that the camera holding structure drives the outer casing to rotate through the linkage mechanism.

18. The camera according to claim 15, wherein one of the driving part and the driven part comprises a protrusion, the other of the driving part and the driven part comprises two pushing portions, the protrusion is limitedly disposed between the two pushing portions, and the driving part and the driven part are mutually driven by the protrusion selectively abutting the two pushing portions.

19. The camera according to claim 15, wherein the driving part and the driven part are kinematically connected through at least one gear.

20. The camera according to claim 15, wherein the linkage mechanism comprises an intermediate gear, the intermediate gear comprises a plurality of outer teeth and a plurality of inner teeth, the driving part meshes with the plurality of inner teeth, and the driven part meshes with the plurality of outer teeth.

* * * * *